United States Patent
Zhang (10) Patent No.: US 9,759,977 B2
(45) Date of Patent: Sep. 12, 2017

(54) ELECTRONIC HANDWRITING SCREEN

(75) Inventor: Zhuo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 384 days.

(21) Appl. No.: 13/701,651

(22) PCT Filed: Aug. 1, 2012

(86) PCT No.: PCT/CN2012/079532
§ 371 (c)(1),
(2), (4) Date: Feb. 21, 2013

(87) PCT Pub. No.: WO2013/017089
PCT Pub. Date: Feb. 7, 2013

(65) Prior Publication Data
US 2013/0155490 A1    Jun. 20, 2013

(30) Foreign Application Priority Data

Aug. 3, 2011 (CN) .......................... 2011 1 0221059

(51) Int. Cl.
*G02B 26/00* (2006.01)
*G02F 1/167* (2006.01)
(Continued)

(52) U.S. Cl.
CPC .............. *G02F 1/167* (2013.01); *G06F 3/041* (2013.01); *G06F 3/045* (2013.01); *G06F 3/0412* (2013.01)

(58) Field of Classification Search
CPC ............. G02F 1/167; G02F 2001/1678; G02F 2001/1672; G02F 2001/1676; G02B 26/00
(Continued)

(56) References Cited

U.S. PATENT DOCUMENTS 6,118,571 A * 9/2000 Wessels .................. C23C 16/40
                                                       359/245
6,750,844 B2 * 6/2004 Nakanishi ..................... 345/107
(Continued)

FOREIGN PATENT DOCUMENTS

CN        101154008 A    4/2008
CN        101382718 A    3/2009
(Continued)

OTHER PUBLICATIONS

International Search Report: dated Aug. 3, 2011; PCT/CN2012/079532.
(Continued)

*Primary Examiner* — Bumsuk Won
*Assistant Examiner* — Tamara Y Washington
(74) *Attorney, Agent, or Firm* — Ladas & Parry LLP (57) ABSTRACT

The embodiments of present invention disclose an electronic handwriting screen and relate to the field of electrophoretic display techniques. In the embodiment of present invention, because insulation spacing elements are provided between the electrophonic display functional film and the bottom electrode, when an appropriate voltage is applied between the top electrode and the bottom electrode, the top electrode is pressed so as to make the electrophonic display functional film contact with the bottom electrode, which shortens the distance between the top electrode and the bottom electrode and further increases the electric field force acting on the charged colorant particles; as a result, electrophoresis effect occurs in the electrophoresis liquid so that patterns are displayed or erased at the pressing location, and handwriting function is thereby realized without a touch screen, reducing the manufacturing costs for an electronic handwriting screen.

15 Claims, 4 Drawing Sheets

(51) Int. Cl.
*G06F 3/041* (2006.01)
*G06F 3/045* (2006.01)

(58) Field of Classification Search
USPC ............... 359/290–298, 237–254, 265–275; 345/107
See application file for complete search history.

(56) References Cited

U.S. PATENT DOCUMENTS

| | | | |
|---|---|---|---|
| 6,873,451 | B2* | 3/2005 | Ukigaya ..................... 359/296 |
| 7,746,541 | B2* | 6/2010 | Cernasov .................... 359/296 |
| 2003/0137717 | A1* | 7/2003 | Albert .................. G02B 26/026 |
| | | | 359/296 |
| 2006/0050356 | A1* | 3/2006 | Varaprasad ............... B60R 1/12 |
| | | | 359/265 |
| 2007/0268555 | A1* | 11/2007 | Chopra et al. ................ 359/296 |
| 2008/0012006 | A1* | 1/2008 | Bailey et al. ................... 257/40 |
| 2009/0109520 | A1* | 4/2009 | Park et al. ................... 359/296 |

FOREIGN PATENT DOCUMENTS

| | | | |
|---|---|---|---|
| CN | 101893801 | A | 11/2010 |
| CN | 201628941 | U | 11/2010 |
| CN | 102081272 | A | 6/2011 |

OTHER PUBLICATIONS

International Preliminary Report on Patentability dated Feb. 4, 2014; PCT/CN2012/079532.
First Chinese Office Action dated Apr. 30, 2014; Appln. No. 201110221059.X.

* cited by examiner

ELECTRONIC HANDWRITING SCREEN

TECHNICAL FIELD

An embodiment of present invention relates to an electronic handwriting screen.

BACKGROUND

An electronic paper technique is a new display technique, and currently is widely applied to the electronic readers. The electronic paper techniques mainly use microcup-type and microcapsule-type electrophoretic display techniques, both of which achieve at least bicolor display with electrophoretic liquid.

Figure 7:
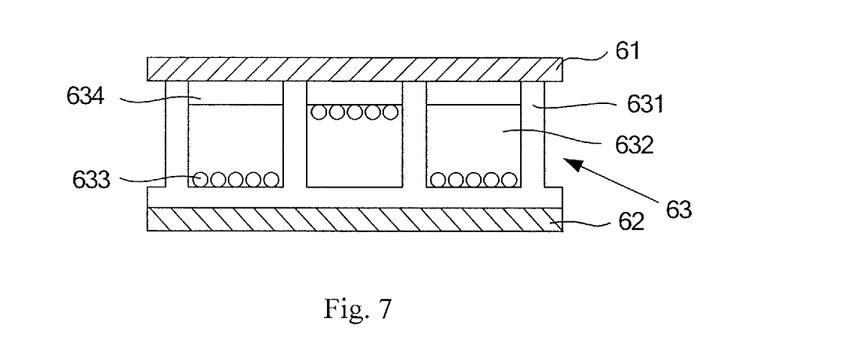
FIG. 7 is a schematic cross-sectional view of a prior microcup-type electronic display screen.

The configuration of an existing microcup-type electronic display screen is shown in FIG. 7. The display screen comprises a top electrode 61, a bottom electrode 62 and an electrophoretic display functional film 63 located between the top electrode 61 and the bottom electrode 62. The electrophoretic display functional film 63 is constituted with a microcup array 631, electrophoretic liquid 632 contained within each microcup of the microcup array 631, charged colorant particles 633 dispersed in the electrophoretic liquid 632, and a sealing layer 634 for sealing the openings of the microcups. When a voltage is applied between the top electrode 61 and the bottom electrode 62, the colorant particles bearing a same kind of charges within the electrophoretic liquid 632 are acted by an electric field and gather around the side of the top electrode 61 or bottom electrode 62 of the microcups, and therefore the top electrode 61 or bottom electrode 62 exhibits a certain color, thus reaching the effect of displaying an image.

Figure 8:
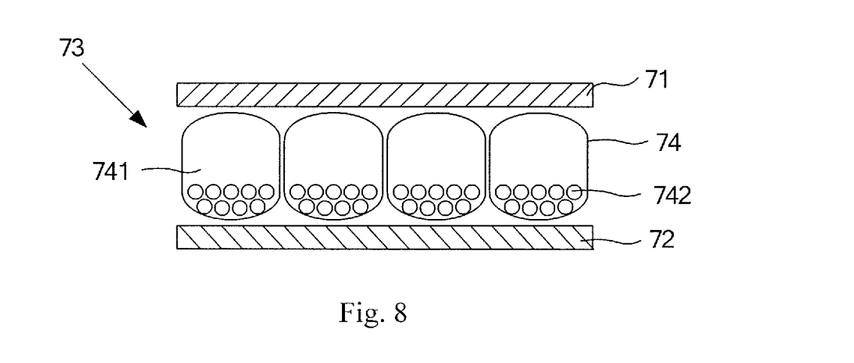
FIG. 8 is a schematic cross-sectional view of a prior microcapsule-type electronic display screen.

The configuration of the existing microcapsule-type electronic display screen is shown in FIG. 8. The display screen comprises a top electrode 71, a bottom electrode 72, and an electrophoretic display functional film 73 located between the top electrode 71 and the bottom electrode 62. The electrophoretic display functional film 73 is constituted with a plenty of microcapsules 74 closely arranged side by side, and electrophoretic liquid 741 is enclosed within each microcapsule 74, and the charged colorant particles 742 are dispersed in the electrophoretic liquid 741. When a voltage is applied between the top electrode 71 and the bottom electrode 72, the colorant particles bearing a same kind of charges within the electrophoretic liquid 741 are acted by an electric field and gather around the side of the top electrode 71 or bottom electrode 72 of the microcapsules, and therefore the top electrode 71 or bottom electrode 72 exhibits a certain color, thus reaching the effect of displaying an image.

Most of the current handwriting screens are formed by combining a display screen and a touch module, the touch module provides positional information, and the display screen provides display function. On one hand, for such handwriting screens, the costs of the touch module and the display screen are high, and on the other hand, software and hardware integration between the systems of the touch screen and the display screen are needed. Therefore, the manufacture costs are high. Furthermore, the endurance power of such handwriting screens is low since the display screen and the circuitry need standby electric power.

SUMMARY

One embodiment of the present invention provides an electronic handwriting screen, composing: a top electrode, an electrophoretic display functional film and a bottom electrode, the electrophonic display functional film is arranged between the top electrode and the bottom electrode, wherein the electrophonic display functional film and the bottom electrode are provided with insulation spacing elements therebetween, and the insulation spacing elements are used to create a gap between the electrophonic display functional film and the bottom electrode.

Another embodiment of the present invention provides an electronic handwriting screen, composing: the above mentioned electronic handwriting screen, a voltage inversing circuit and a power source input terminal, the power source input terminal supplying power to the electronic handwriting screen through the voltage inversing circuit; the voltage inversing circuit is used for inversing the voltage supplied from the power source input terminal to the electronic handwriting screen so as to apply a forward voltage or a reverse voltage between the top electrode and the bottom electrode of the electronic handwriting screen.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

The technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
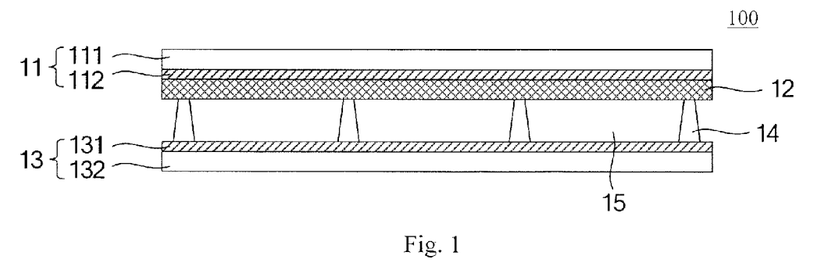
FIG. 1 is a schematic cross-sectional view of an electronic handwriting screen according to embodiment 1 of the present invention.

The embodiment of the present invention provides an electronic handwriting screen 100 as shown in FIG. 1, and this electronic handwriting screen comprises a top electrode 11, an electrophoretic display functional film 12, and a bottom electrode 13. The electrophoretic display functional film 12 is arranged between the top electrode 11 and the bottom electrode 13. In addition, the electrophonic display functional film 12 and the bottom electrode 13 are provided with insulation spacing elements 14 therebetween, and the insulation spacing elements 14 are used to create a gap 15 between the electrophonic display functional film 12 and the bottom electrode 13.

The top electrode 11 is constituted with a first substrate 111 and a first layer 112 of indium tin oxide (ITO) coated on the surface thereof. The bottom electrode 13 is constituted with a second substrate 131 and a second ITO layer 132 coated on the surface thereof. As shown in FIG. 1, the second ITO layer 132, the insulation spacing elements 14, the electrophoretic display functional film 12, the first ITO layer 112 and the first substrate 111 are formed in this order on the second substrate 131 from the bottom up. ITO is an example of transparent conductor materials, and can be replaced with indium zinc oxide (IZO), tin oxide ($SnO_2$), or the like.

The materials for the first substrate 111 and the second substrate 131 may be, but not limited to, thermoplastic polyester (PET).

The above-mentioned top electrode 11 and the electrophoretic display functional film 12 together constitute an electrophoretic display functional assembly, and this assembly is an available product in the market; the manufacturing procedure is for example as follows: firstly, a first ITO layer 112 is formed on the first substrate 111, and then an electrophoretic display functional film 12 is formed on the first ITO layer 112.

The electrophoretic display functional film 12 is encapsulated with electrophoretic liquid therein, and charged colorant particles (not shown) of a same specific weight as the electrophoretic liquid are dispersed in the electrophoretic liquid. When the electrophoretic display functional film 12 is in use, it is arranged between the top electrode and the bottom electrode. When a voltage is applied across the two electrodes, an electric field can be created in the electrophoretic display functional film. It is given that there exist two kinds of particles: white particles and black particles (which may be particles of at least two other colors), the white particles are charged with negative charges, and the black particles are charged with positive charges. With a forward voltage applied between the top electrode and the bottom electrode, the white particles with negative charges are acted by an electric field and then swim to a location close to the top electrode, while the black particles with positive charges are acted by the electric field and then swim to a location close the bottom electrode. On the assumption that the bottom electrode is a transparency electrode, the color of the black particles can be displayed through the bottom electrode, thus achieving the effect of displaying a pattern by making the pixels colored to be white/black.

When the forward voltage applied between the top electrode and the bottom electrode is reversed, the black particle and white particle move in the opposite directions respectively, and when the white particles move to the vicinity of the bottom electrode, the originally displayed black pattern vanishes if being watched from the side of the bottom electrode, thus achieving an effect of pattern erasing.

Experiments reveal that, when the above-mentioned electrophoretic display functional assembly is used, the height of the gap 15 can be kept in 10 μm-3 mm, preferably 20 μm-500 m, through setting of the height of the insulation spacing elements 14, thereby a better display effect can be achieved for the electronic handwriting screen. Naturally, the height of the gap is not limited thereto, and can also be set according to the property of the selected electrophoretic display functional assembly, the magnitudes of the voltages of the power source for the electronic handwriting screen and so on; any gap height can be used in the scope of the present invention as long as pattern display can be realized when the electronic handwriting screen is pressed after a voltage is applied between the top electrode and the bottom electrode.

The manufacturing method of the above electronic handwriting screen is as follows.

Step A1, insulation spacing elements 14 are formed on the bottom electrode 13.

Step A2, an electrophoretic display functional assembly is attached onto the insulation spacing elements 14, and the electrophoretic display functional assembly includes an electrophoretic display functional film 12 and a top electrode 11 in order from the bottom up.

The insulation spacing elements 14 are used for forming a gap 15 between the electrophoretic display functional film 12 and the bottom electrode 13.

The insulation spacing elements 14 may be not formed onto the bottom electrode 13 but onto the electrophoretic display functional film 12. Therefore, the manufacturing method of the electronic handwriting screen may also be the following.

Step B1, insulation spacing elements 14 are formed onto an electrophoretic display functional film 12 of an electrophoretic display functional assembly, and the electrophoretic display functional assembly includes the electrophoretic display functional film 12 and a top electrode 11 in order from the bottom up.

Step B2, the electrophoretic display functional assembly formed with insulation spacing elements 14 is attached to the bottom electrode 13, and the insulation spacing elements 14 contact with the bottom electrode 13.

Figure 2:
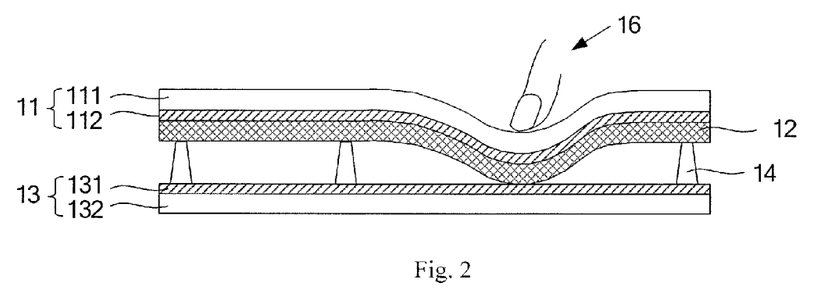
FIG. 2 is a schematic cross-sectional view of the electronic handwriting screen according to embodiment 1 of the present invention in performing handwriting operations.

The present embodiment further provides an operating process for the above electronic handwriting screen, and the method includes the following steps, as shown in FIG. 2.

Step C1, applying a positive voltage onto the top electrode 11 and connecting the bottom electrode 13 to the ground. The above voltage creates voltage difference between the top electrode 11 and bottom electrode 13, thus a forward electric field is established therebetween.

An appropriate voltage is selected in such a way that before the contact object 16 is pressed on the electronic handwriting screen, the voltage difference is not enough to cause the swimming motion of the charged colorant particles in the electrophoretic liquid.

Step C2, pressing the contact object (shown as a finger in FIG. 2, while any other tools capable of being pressed onto the electronic handwriting screen is also applicable, such as a pen) 16 onto the top electrode 11, causing the top electrode 11 and electrophoretic display functional film 12 deform together so that the electrophoretic display functional film 12 corresponding to the pressing location contact with the bottom electrode 13. At this time, the distance between the top electrode 11 and bottom electrode 13 become short such that the charged colorant particles receive an increased electric field force, electrophoresis occurs and the negatively charged colorant particles gather around the side of the top electrode 11. If the color of the negatively charged colorant particles is black or a color other than white, the pattern of the corresponding color will be displayed on the side of the top electrode 11.

Step C3, applying a positive voltage onto the top electrode 11 and connecting the bottom electrode 13 to the ground. That is to say, the voltage applied between the top electrode 11 and bottom electrode 13 is reversed, causing a reversed electric field.

Step C4, pressing the contact objects 16 onto the top electrode 11, causing the top electrode 11 and the electrophoretic display functional film 12 to deform together and thus the electrophoretic display functional film 12 corresponding to the pressing location contact with the bottom electrode 13, and therefore, an electric field being opposite in direction to the electric field in the above step C2 is established in the electrophoretic display functional film 12 corresponding to the pressing location, such that in the electrophoretic display functional film 12 at this location, the negatively charged colorant particles swim to the side of the bottom electrode 13, while the positively charged colorant particles swim to the side of the top electrode 13. If the positively charged colorant particles are white, the originally displayed pattern at the side of the top electrode 11 will be erased by this step. If the positively charged colorant particles are not white and have colors different from that of the negatively charged particles, the color of the originally displayed pattern at the side of the top electrode 11 will be changed by this step.

The performance of the above steps C1-C4 is not necessary be done in the above order, but can be selected as required.

In the electronic handwriting screen provided in this embodiment, when an appropriate voltage is applied between the top electrode and bottom electrode, a gap exists between the electrophoretic display functional film and the bottom electrode, resulting in a relatively little electric field force acting on the colorant particles in the electrophoretic display functional film, which force is not enough to induce an electrophoresis of the charged colorant particles in the electrophoretic liquid. However, when the top electrode is pressed so as to contact the electrophoretic display functional film with the bottom electrode, the distance between the top electrode and the bottom electrode is shortened, then the charged colorant particles are subject to an increased electric field force, electrophoresis occurs and the effect of image display is achieved, thus handwriting function is realized while a touch screen is not necessary. When pressing is completed, the deformation is restored, thus the insulation spacing elements support up the electrophoretic display functional film and the top electrode so as to maintain the gap between the upper and lower layers. Due to the bistable property of the electrophoretic display functional film, the effect of image display, which is formed upon pressing, will be maintained. The configuration of the electronic handwriting screen is simple, and therefore the manufacturing method thereof is also simple. In addition, since the touch object for pressing the top electrode can be any tool capable of being pressed onto the electronic handwriting screen, the disadvantage in the prior art that a dedicated touch object are needed for the touch screen can be overcome, which problem causes an inconvenient touch screen operation, and an advantage of a simpler manipulation is provided.

Embodiment 2

Figure 3:
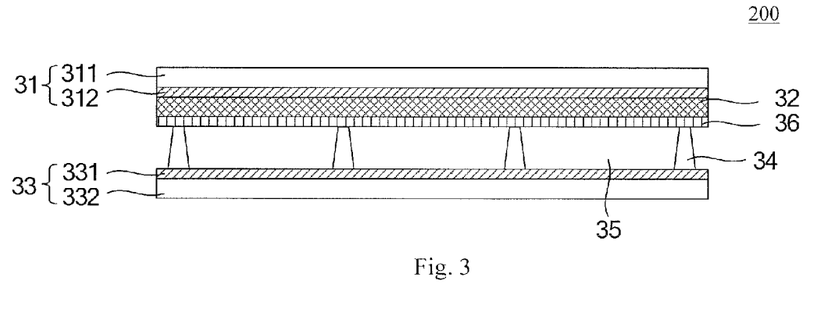
FIG. 3 is a schematic cross-sectional view of an electronic handwriting screen according to embodiment 2 of the present invention.

This embodiment provides an electronic handwriting screen 200, as shown in FIG. 3. The electronic handwriting screen 200 comprises a top electrode 31, an electrophonic display functional film 32 and a bottom electrode 33. The electrophoretic display functional film 32 is arranged between the top electrode 31 and the bottom electrode 33. In addition, the electrophonic display functional film 32 and the bottom electrode 33 are provided with insulation spacing elements 34 therebetween, and the insulation spacing elements 34 are used to create a gap 35 between the electrophonic display functional film 32 and the bottom electrode 33.

What is different from the electronic handwriting screen provided by the embodiment 1 lies in that, the electronic handwriting screen provided in this embodiment further includes a semiconductor film 36, which is arranged on the surface at the side of the electrophoretic display functional film 32 adjacent to the insulation spacing elements 34. For example, the thickness of the semiconductor film 36 here can be set to be less than 200 µm, and the resistivity thereof can be set to be greater than 1000 ohms·cm. Of course, the thickness and resistivity of the semiconductor film 36 can be selected according to different performance requirements for the electronic handwriting screen.

Because the conductive behavior of the semiconductor film 36 is between a conductive film and an insulation film, it has a larger dielectric constant. The semiconductor film 36 for example can be made with an inorganic or organic semiconductor material. When the electronic handwriting screen is in use, the contact object (not shown in FIG. 3) is pressed onto the top electrode 31, such that the top electrode 31 and the electrophoretic display functional film 32 deform together with the semiconductor film 36. When the semiconductor film 36 contact with the bottom electrode 33, an electric field is established in the electrophoretic display functional film 32 close to the pressing location, the intensity of the electric field gradually reduced from the inner to the outer with the pressing location as a center; and therefore the pattern displayed around the pressing location gradually weak from the inner to the outer with the pressing location as the center, which realizes an effect of ink diffusion.

The top electrode 31 is constituted with a first substrate 311 and a first ITO layer 312 coated onto the surface thereof. The bottom electrode 33 is constituted with a second substrate 331 and a second ITO layer 332 coated onto the surface thereof. As shown in FIG. 3, the second ITO layer 332, an insulation spacing elements 34, a semiconductor film 36, an electrophoretic display functional film 32, the first ITO layer 312 and the first substrate 311 are formed on the second substrate 331 in this order from the bottom up. Both the First ITO layer 312 and the second ITO layer 332 can be formed of another transparent conductor material instead.

The material for the first and second substrates may be, but not limited to, PET.

The above top electrode 31 and the electrophoretic display functional film 32 constitute in combination the electrophoretic display functional assembly.

The manufacturing method for the electronic handwriting screen of this embodiment is essentially the same as that for the electronic handwriting screen in the embodiment 1, the only difference lies in that, after the formation of the insulation spacing elements in step A1 and before attaching the electrophoretic display functional assembly in step A2 of the embodiment 1, a step of attaching a layer of semiconductor film onto the electrophoretic display functional film of the electrophoretic display functional assembly is added. Then, the electrophoretic display functional assembly having a semiconductor film is attached onto the insulation spacing elements so as to contact the semiconductor film with the insulation spacing elements, achieving an electronic handwriting screen above-described in this embodiment.

Or, before forming an insulation spacing elements on the electrophoretic display functional film in step B1, a step of attaching a layer of semiconductor film onto the electrophoretic display functional film of the electrophoretic display functional assembly is added. Then, by performing of the step B2, the electronic handwriting screen above-described in this embodiment is achieved.

Due to the configuration of the semiconductor film arranged onto the surface of the electrophoretic display functional film of the electrophoretic display functional assembly, a pattern of ink-diffusion effect is displayed at the pressing location in the electronic handwriting screen of this embodiment, in addition to the advantage of the electronic handwriting screen in embodiment 1.

Embodiment 3

Figure 4:
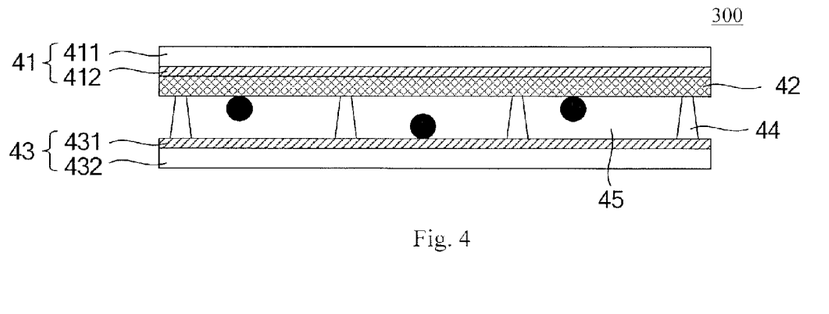
FIG. 4 is a schematic cross-sectional view of an electronic handwriting screen according to embodiment 3 of the present invention.

This embodiment provides an electronic handwriting screen 300, as shown in FIG. 4. The electronic handwriting screen 300 comprises a top electrode 41, an electrophoretic display functional film 42 and a bottom electrode 43. The electrophoretic display functional film 42 is arranged between the top electrode 41 and the bottom electrode 43. In addition, the electrophonic display functional film 42 and the bottom electrode 43 are provided with insulation spacing elements 44 therebetween, and the insulation spacing elements 44 are used to create a gap 45 between the electrophonic display functional film 42 and the bottom electrode 43.

The top electrode 41 is constituted with a first substrate 411 and a first ITO layer 412 coated onto the surface thereof. The Bottom electrode 43 is constituted with a second substrate 431 and a second ITO layer 432 coated onto the surface thereof. Both the first ITO layer 412 and the second ITO layer 432 can be formed of another transparent conductor material instead. The material for the first and second substrates may be, but not limited to, PET.

Different from the electronic handwriting screen of the embodiment 1, the electronic handwriting screen provided by this embodiment further includes conductive structures 46 arranged in the gap 45. For example, the height of the conductive structure 46 is less than the height of the gap 45 by at least 3 μm, so as to ensure a spacing of at least 3 μm between the electrophoretic display functional film 42 and the bottom electrode 43 for preventing the charged colorant particles in the electrophoretic display functional film 42 from being subject to an excessive acting force of the electric field due to a too small spacing when the electronic handwriting screen is energized, and thus avoiding the electrophoresis effect of the charged colorant particles caused by the excessive acting force in a situation in which the top electrode is not pressed. The arrangement of the conductive structure 46 into the gap 45 is to prevent the adhesion of the adhesive electrophoretic display functional film 42 with the second ITO layer 412 when being pressed to deform.

The conductive structure 46 can be made by a metal material, and can also be a structure with a conductor material coated onto the surface thereof, such as one structure with an inorganic or organic material as its inner material and a conductor material coated onto the surfaces. The conductive structure 46 in FIG. 4 is but not limited to a sphere shape, and for example, it can be a cylindrical shape or an irregular shape and the like.

The conductive structure of this embodiment may also be placed in the gap of the electronic handwriting screen provided in the embodiment 2. It's possible to prevent the adhesive semiconductor film in embodiment 2 from being stuck to the second ITO layer when the semiconductor film is pressed to deform.

The above top electrode 41 and the electrophoretic display functional film 42 constitute in combination the electrophoretic display functional assembly.

The manufacturing method for the electronic handwriting screen of this embodiment is essentially the same as that for the electronic handwriting screen in embodiment 1, the only difference lies in that, after the formation of the insulation spacing elements in step A1 and before attaching the electrophoretic display functional assembly in step A2 of the embodiment 1, a step of spraying conductive structures onto the electrophoretic display functional film of the electrophoretic display functional assembly is added. Then, the electrophoretic display functional assembly having the conductive structures is attached onto the insulation spacing elements in a way of the conductive structure facing the insulation spacing elements, so that the side of the electrophoretic display functional assembly having the conductive structure contact with the insulation spacing elements, achieving an electronic handwriting screen above-described in this embodiment.

Or, before forming insulation spacing elements on the electrophoretic display functional film in step B1 of embodiment 1, a step of spraying conductive structure 46 onto the electrophoretic display functional film of the electrophoretic display functional assembly is added. Then, with performance of the step B2, the electronic handwriting screen above-described in this embodiment is achieved.

When the press onto the electronic handwriting screen is removed, the conductive structure 46 stuck onto the electrophoretic display functional film may adhere onto the second ITO layer 412 (as shown in FIG. 4), which prevents the electrophoretic display functional film from being stuck to the second ITO layer 412.

If it is necessary to place the conductive structures in the gap of the electronic handwriting screen provided in embodiment 2, it is needed to add of a step, that is, to spray a conductive structure onto the semiconductor film, after the step of attaching the semiconductor film in embodiment 2, and then an electronic handwriting screen provided with a semiconductor film and a conductive structure of this embodiment is achieved.

Due to the conductive structure placed in the gap, the electronic handwriting screen provided by this embodiment has an improved conduction capability in addition to the advantages of the electronic handwriting screens in embodiments 1 and 2, and can prevent the adhesive electrophoretic display functional film or adhesive semiconductor film, when being pressed to deform, from being stuck to the second ITO layer 412.

The insulation spacing elements in the above embodiments may be any one of ball spacer, pad spacer, cylinder spacer and porous membrane, or insulation spacing elements of other shapes known by those skilled in this art. Such insulation spacing elements may be resilient so as to avoid damage to the insulation spacing elements due to the deformation thereof, when the top electrode is pressed.

Figure 5A:
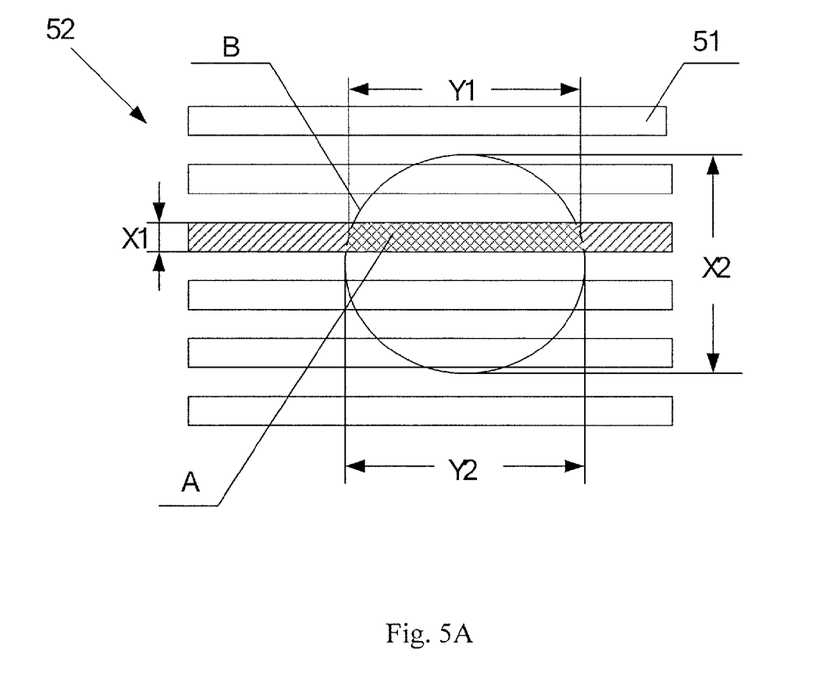
FIG. 5A to 5C are schematic diagrams for the principle of improving pattern fineness, when strip electrodes are employed for the bottom electrodes in the embodiment 3 of the present invention.

The bottom electrodes of the electronic handwriting screen in the above embodiments each may be any one of a flexible conductive substrate and a metal sheet, such that the bottom electrode is flexible and then the electronic handwriting screen has a better flexibility as a whole. The second ITO layer of the bottom electrode may be a successive plate-shaped ITO layer and attached onto the second substrate. In use of the electronic handwriting screen, the electrophoretic display functional film or a semiconductor film is pressed to deform and then contacts with the bottom electrode, and the larger the area of the contacting portion is, the bigger the displayed pattern becomes. In order to improve the resolution of displayer pattern, the second ITO layer can be patterned into various shapes, such as strip-shape. As shown in FIG. 5, a plurality of linear strip electrodes 51 constitute bottom electrode 52 in a side-by-side arrangement.

When the electrophoretic display functional film or the semiconductor film is pressed to contact with the strip electrode 51, a pattern can be displayed at this strip electrode (for example, the hatched strip electrode shown in FIG. 5) only if the contacted strip electrode is energized; but as to the strip electrodes other than this energized strip electrode (for example, the hatched strip electrode shown in FIG. 5), a pattern can not be formed at these strip electrodes due to the state of being unpowered or existence of a negative voltage. Also, the width X1 of the pattern region A formed in the direction perpendicular to the extending direction of the strip electrode is narrower than the width X2 of the contact surface B between finger and the top electrode, and therefore a finer pattern can be displayed.

The bottom electrode shown in FIG. 5A is constituted by linear strip electrodes 51 side-by-side, and when the top electrode is pressed, a part of the strip electrodes are energized while the other strip electrodes are not energized or applied with a negative voltage, and therefore, it's possible to make a finer pattern in the direction perpendicular to the extending direction of the strip electrode, while in the extending direction of the strip electrode, as the width Y1 of the formed pattern region is essentially the same as the width Y2 of the contact surface B, the pattern cannot be refined.

Figure 5B:
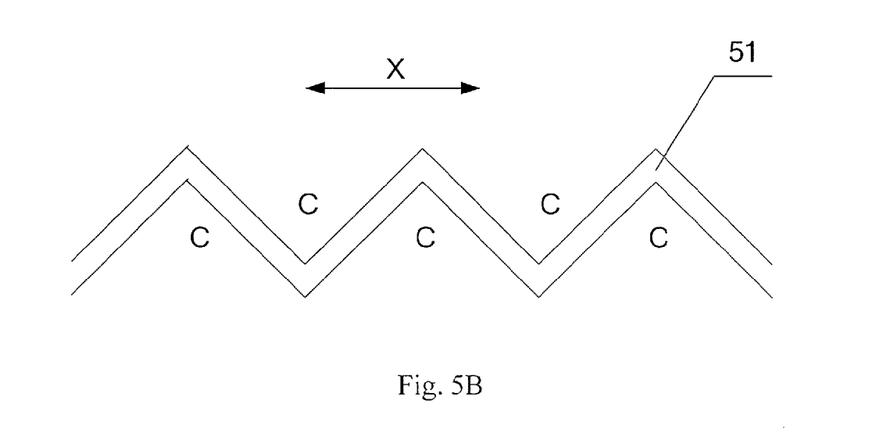
Figure 5C:
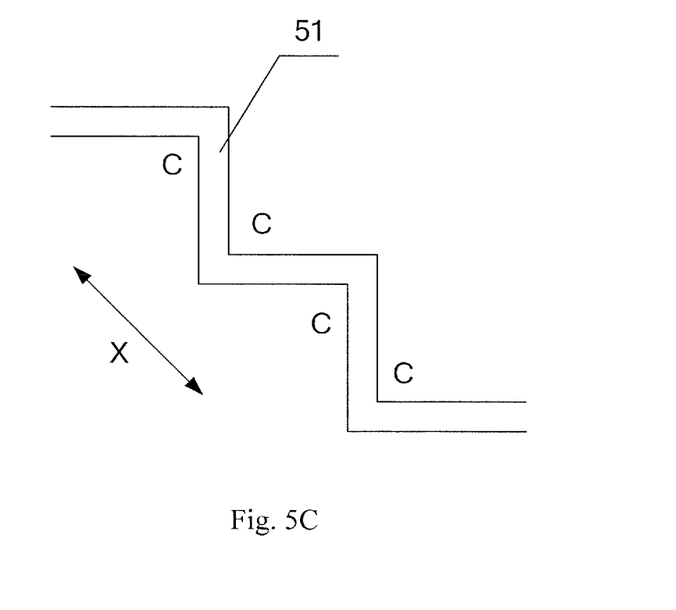

In order to achieve a finer pattern in the extending direction of the strip electrodes, the strip electrodes can be wave-shaped as shown in FIG. 5B or 5C, and in the extending direction X of the strip electrodes 51, a backlash C exists along both sides of the wave-shaped strip electrodes and does not display image, and therefore, the fineness of the pattern along the extending direction of the strip electrodes can be improved.

For example, the strip width of the strip electrode is 200 μm, and the spacing among two adjacent strip electrodes is preferably 15 μm. Of course, the strip width of the strip electrode is not limited thereto and can be selected as required, and generally, the strip width may be less than the width of the contact surface between the finger and the top electrode. The strip electrode is also not limited to the above linear or wave-like shape, but other shapes are applicable.

In addition, in the above embodiments, too many insulation spacing elements can decrease the effective display area of the electronic handwriting screen and thus the display resolution. Therefore, experiments prove that, when the ratio of the sum of areas of the maximum cross section of all the insulation spacing elements in the electronic handwriting screen to the area of the electrophoretic display functional film is less than 50%, there's no influence on the display effect.

In the above embodiments, the gap can be filed with air and also can be filled with insulating liquid. In the electronic handwriting screens provided in above embodiments 2 and 3, when an appropriate voltage is applied between the top electrode and bottom electrode, a gap exists between the electrophoretic display functional film and the bottom electrode, resulting in a relatively small electric field force acting on the colorant particles in the electrophoretic display functional film, which force is not enough to induce an electrophoresis of the charged colorant particles in the electrophoretic liquid. However, when the top electrode is pressed so as to make the electrophoretic display functional film contact with the bottom electrode, the distance between the top electrode and the bottom electrode is shortened, then the charged colorant particles are subject to an increased electric field force, electrophoresis effect occurs for the charged colorant particles in the electrophoretic liquid, achieving an effect of image display. When pressing is completed, the deformation is restored, thus the insulation spacing elements will support up the electrophoretic display functional film and the top electrode so as to maintain the gap between the upper and lower layers. Due to the bistable property of the electrophoretic display functional film, the effect of image display, formed upon pressing, will be maintained. Thereby, handwriting function is realized without a touch screen, and further, the electronic handwriting screen has a simpler configuration, thus the manufacturing method thereof is simpler, its costs are low, and the power consumption is extremely low as well. In the meantime, a better technological effect can be realized by further providing a semiconductor film or the conductive structures.

In addition, since the touch object for pressing the top electrode can be any tool capable of being pressed onto the electronic handwriting screen, the disadvantage in the prior art that a dedicated touch object is needed for the touch screen, is overcome, which causes an inconvenient touch screen operation, and a simple manipulation is provided. Furthermore, the erase operation is facilitated by reversing the voltage applied between the top electrode and bottom electrode, hence further improving the convenience of the operation.

Embodiment 3

This embodiment provides an electronic handwriting screen device, which includes one of the electronic handwriting screens described in embodiments 1 to 3 and further comprises a voltage inversing circuit and a power source input terminal, and the power source input terminal is connected to power source P to supply power to the electronic handwriting screen via the voltage inversing circuit. The voltage inversing circuit is used for inversing the voltage supplied by the power source via the power source input terminal to the electronic handwriting screen, so as to apply a forward voltage or a reverse voltage between the top electrode and the bottom electrode of the electronic handwriting screen.

Figure 6:
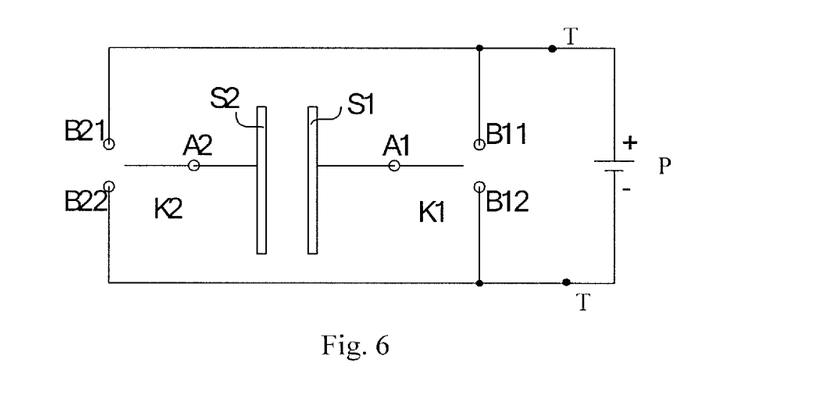
FIG. 6 is a circuit diagram of the connection from the voltage inversing circuit to the top electrode and the bottom electrode in the electronic handwriting screen according to embodiment 4 of the present invention.

An example of the control circuit for reversing voltage is shown in FIG. 6. The power source P, the power source input terminal T, the switch K1 and switch K2 are connected in series; the switch K1 has a fixed end A and unfixed ends B11 and B12, the switch K2 has a fixed end A2 and unfixed ends B21 and B22. The top electrode S1 is connected with the fixed end A1 of the switch K1, and the bottom electrode S2 is connected with the fixed end A2 of the switch K2. The switches K1 and K2 can be provided with ganged switch. The unfixed end B11 of the switch K1 is connected with the unfixed B22 of the switch K2, then with the positive pole of the power source B; the unfixed end B12 of the switch K1 is connected with the unfixed B22 of the switch K2, then with the negative pole of the power source B.

Upon switching the switch blade of switch K1 to the unfixed end B11 and in the mean time switching the switch blade of switch K2 to the unfixed end B22, a forward voltage is applied between the top electrode S1 and the bottom electrode S2. Upon switching the switch blade of switch K1 to the unfixed end B12 and in the mean time switching the switch blade of switch K2 to the unfixed end B21, a forward voltage is applied between the top electrode S1 and the bottom electrode S2.

Of course, the voltage inversing circuit can be any circuit known to those skilled in the art, which being capable of inversing voltage. The power source P can be a battery or other DC power supply, which is connected to working elements of the electronic handwriting screen device via the power source input terminal T.

By employing the electronic handwriting screen described in embodiments 1 to 3, the electronic handwriting screen device provided in this embodiment then can address the problems in prior art, such as high manufacturing costs, high power consumption, and poor operation convenience.

Since the voltage inversing circuit can inverse the voltage applied between the top electrode and bottom electrode, it is very convenient to perform erase operation on the electronic handwriting screen, and the operation convenience of this electronic handwriting screen can be further improved.

The embodiments of the present invention are mainly applied to the electronic products, such as message board, schoolroom whiteboard etc, that employ the electrophoretic display techniques.

All the above are only specific embodiments of the present invention, but the scope of the present invention is not limited thereto, and various changes and alternation can be easily obtained by the skilled in this art within the disclosed technical scope by this invention, all of which should be encompassed in the protection scope of the present invention. Hence, the protection scope of the present invention should be accord with the protection scope of the claims.

The invention claimed is:

1. An electronic handwriting screen, comprising: a top electrode, an electrophoretic display functional film, a semiconductor film and a bottom electrode, that are provided from top down, the electrophoretic display functional film being arranged between the top electrode and the semiconductor film,
wherein the semiconductor film and the bottom electrode are provided with insulation spacing elements therebetween, and the insulation spacing elements are provided on the bottom electrode to protrude upward and support the semiconductor film thereon and configured to create a gap between the semiconductor film and the bottom electrode, and the gap is variable in thickness by movement of the semiconductor film between the top electrode and the bottom electrode in response to force application to the top electrode, the electrophoretic display functional film and the semiconductor film.

2. The electronic handwriting screen according to claim 1, wherein a height of the gap is from 20 μm to 500 μm.

3. The electronic handwriting screen according to claim 1, wherein the semiconductor film has a thickness less than 200 μm and resistivity greater than 1000 ohms·cm.

4. The electronic handwriting screen according to claim 1, wherein the gap is provided with conductive structures therein, and a height of the conductive structure is less than that of the gap by at least 3 μm.

5. The electronic handwriting screen according to claim 4, wherein the conductive structure is made of a metal material, or the conductive structure is a structure coated with a conductor material on the surface thereof.

6. The electronic handwriting screen according to claim 1, wherein the insulation spacing elements are any one of ball spacer, pad spacer, post spacer, or porous membrane, and the insulation spacing elements have resilience.

7. The electronic handwriting screen according to claim 1, wherein the bottom electrode is any one of flexible conductive substrate or metal sheet.

8. The electronic handwriting screen according to claim 1, wherein a ratio of the sum of the maximum cross-section area of all the insulation spacing elements to an area of the electrophoretic display functional film is less than 50%.

9. The electronic handwriting screen according to claim 1, wherein the gap is filled with an insulating liquid therein.

10. The electronic handwriting screen according to claim 1, wherein the bottom electrode is configured by a plurality of strip electrodes arranged in a side-by-side manner.

11. The electronic handwriting screen according to claim 10, wherein the strip electrode assume a wave-like shape.

12. The electronic handwriting screen according to claim 10, wherein the strip electrode has a strip width of 200 μm, and has a spacing to adjacent strip electrode of 15 μm.

13. The electronic handwriting screen according to claim 11, wherein the strip electrode has a strip width of 200 μm, and has a spacing to adjacent strip electrode of 15 μm.

14. An electronic handwriting screen device, composing:
an electronic handwriting screen according to claim 1;
a voltage inversing circuit; and
a power source input terminal, supplying power to the electronic handwriting screen through the voltage inversing circuit;
wherein the voltage inversing circuit is used for inversing the voltage supplied from the power source input terminal to the electronic handwriting screen, so as to apply a forward voltage or a reverse voltage between the top electrode and the bottom electrode of the electronic handwriting screen.

15. An electronic handwriting screen, comprising: a top electrode, an electrophoretic display functional film and a bottom electrode, the electrophoretic display functional film being arranged between the top electrode and the bottom electrode, wherein the electrophoretic display functional film and the bottom electrode are provided with insulation spacing elements therebetween, and the insulation spacing elements are provided on the bottom electrode to protrude upward and to directly contact and support the electrophoretic display functional film thereon and configured to create a gap between the electrophoretic display functional film and the bottom electrode, and the gap is variable in thickness by movement of the electrophoretic display functional film between the top electrode and the bottom electrode in response to force application to the electrophoretic display functional film.

* * * * *